Figure 1:
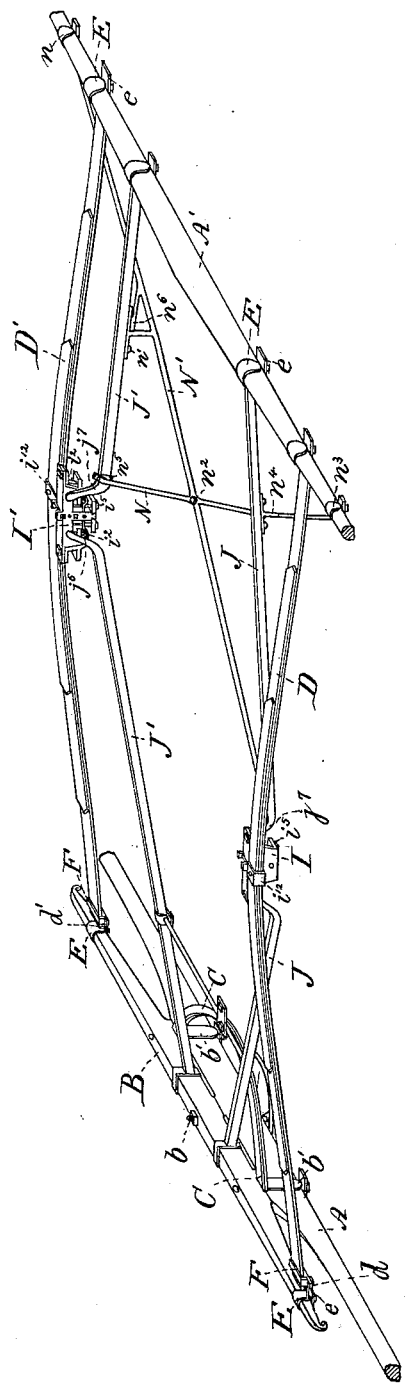

(No Model.) 3 Sheets—Sheet 1.

E. D. WELLER.
RUNNING GEAR FOR VEHICLES.

No. 373,505. Patented Nov. 22, 1887.

WITNESSES: INVENTOR.

(No Model.)  3 Sheets—Sheet 2.
E. D. WELLER.
RUNNING GEAR FOR VEHICLES.
No. 373,505.  Patented Nov. 22, 1887.
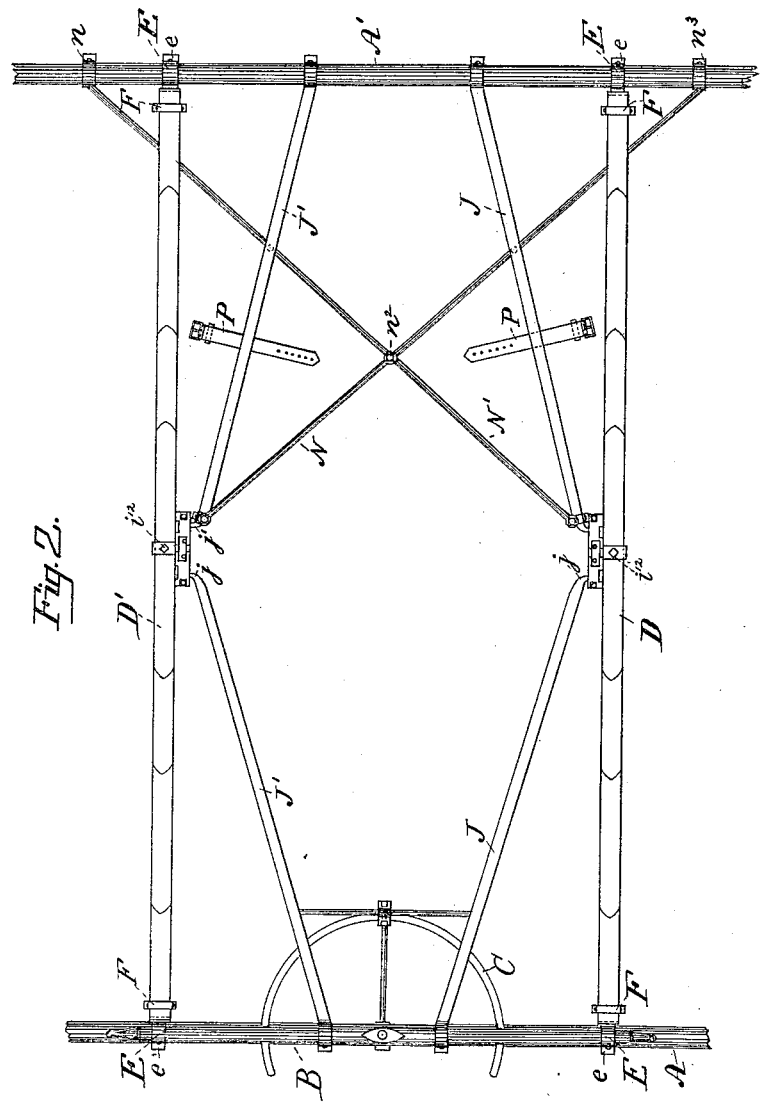
WITNESSES:  INVENTOR.

(No Model.) 3 Sheets—Sheet 3.
E. D. WELLER.
RUNNING GEAR FOR VEHICLES.
No. 373,505. Patented Nov. 22, 1887.
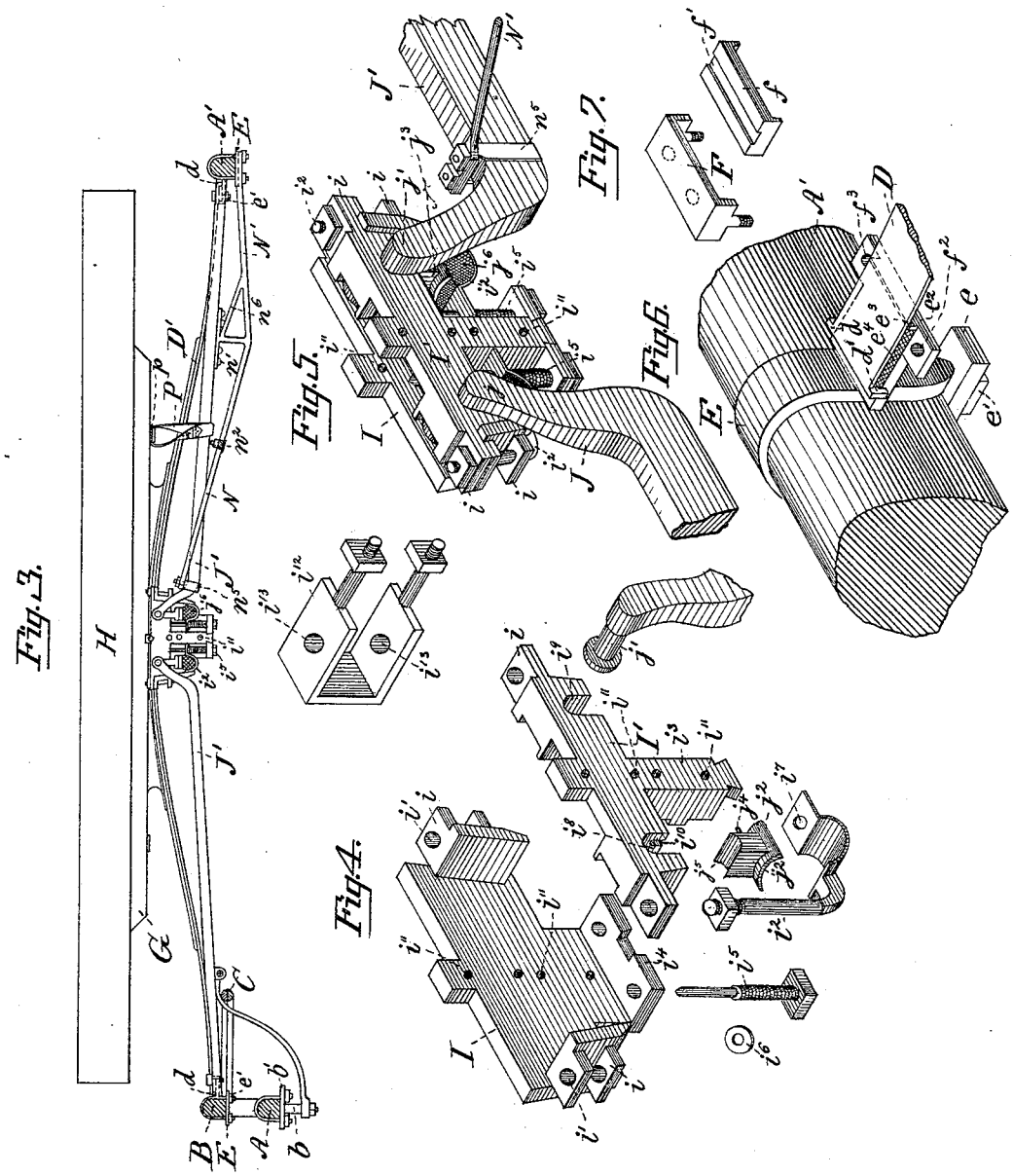
WITNESSES:
Hermann Bormann
Andrew Zane
INVENTOR.
Eugene D. Weller,
by J. Walter Douglass,
atty.

United States Patent Office.

EUGENE D. WELLER, OF PHILADELPHIA, PENNSYLVANIA.

RUNNING-GEAR FOR VEHICLES.

SPECIFICATION forming part of Letters Patent No. 373,505, dated November 22, 1887.

Application filed January 15, 1887. Serial No. 224,395. (No model.)

*To all whom it may concern:*

Be it known that I, EUGENE D. WELLER, of the city and county of Philadelphia, in the State of Pennsylvania, have invented certain new and useful Improvements in Running-Gears for Vehicles, of which the following is a specification.

My invention has relation that class of wagons, carriages, or vehicles having half-elliptical or arched side springs, either in whole or in divided parts, and sectional or divided perches or reaches the inner or central ends of which are coupled or jointed to the side springs at or near their middle.

It is generally admitted that vehicles embodying the above described construction are much easier-riding and safer vehicles than others having their bodies differently supported, as the object of said construction is to connect the sectional or divided perches, springs, and axles together to make their movement synchronous or mutually dependent upon each other for the purposes of relieving the springs from any action upon them except that of the down bearing or gravity of the load, for preventing any one spring or any part of the same receiving more than its proportional share of the load, whether such load falls upon the front, back part, or at one side of the vehicle, and for relieving the body of the vehicle as much as possible of the jolting, jarring, and rolling movements incident to travel.

Heretofore the constructions of jointed-perch and side-spring vehicles have in a degree accomplished the object for which they were devised; but as they were open to certain objections which interfered with their felicity of action and impaired their usefulness, both practically and commercially, attempts heretofore made to introduce them to the public have been unavailing. These objections were—

First. The twisting, torsional, or canting movement of the running-gear, due to the raising or lowering of the wheels of the vehicle as they travel over uneven places of a roadway, imposed undue strain upon the connections for the center ends of the perches and upon those for the ends of the side springs, which connections either broke or bent under such strains, necessitating in the one case expensive repairs or replacement and inducing in the other case looseness or play among the component parts of the connections, which looseness made a noisy or rattling running vehicle, and this defect could not be easily remedied unless new connections were substituted, and if this were done the same bad effects again occurred when the new connections were subjected to such strains.

Second. The ends of the side springs were either directly connected to the axles and bolsters or indirectly by means of links. The former construction permitted a vertical adjustment of the center ends of the perches to keep said centers in nearly a horizontal plane with their end connections for maintaining the axles in a vertical position under a light or heavy load; but the pressure of a heavy load curved the springs at their ends, and the degree of their extension was not then equal to that of the perches, or, in other words, the degree of extension of the springs and of the perches was not then synchronous, and this variation in the rates of their extension when under pressure induced reversed longitudinal strains upon the end connections of the springs, which were detrimental to said connections and produced undue wear accompanied by squeaking noises. On the other hand, while the link-connection for the ends of the springs provided for the synchronous extension of the springs and avoided the foregoing-described objection, yet the links render the vertical adjustment of the perch centers for maintaining the axles in correct vertical position useless. For example, when the perch centers were raised and the axles drawn together the links dropped toward the axles and the springs went down and returned the perch centers to the same plane that they occupied before they were raised, and in this position the links rattled against the axles, whereas when the perch centers were lowered the axles spread apart, which raised the links and in turn the springs, so that the perch-centers were thereby raised to the point from which they were lowered, and in either case the desired adjustment for the perch centers was not effected.

Third. These said spring ends and central end perch-connections not only did not yield to or compensate for the torsional or twisting and canting movements of the running-gear, as well as for those induced by the variation in the degree of extension of the springs and perches under heavy loads, but they were also mechanically too expensive for commercial purposes, more especially so as the need for repairs or replacement was frequent, owing to their inherent defects, as above pointed out.

Fourth. The construction of the brace-rods and their connections to the parts of the running-gear were such that the braces were more or less flexible, and parts or portions of them moved independently of the others. Consequently the springs did not move in unison when one was subjected to a load in excess of that imposed upon the other, which load, therefore, was not equally distributed upon or carried by both springs.

Fifth. The one check-strap heretofore used was so connected to the perches or brace-rods and to the body that the check-down for the springs could not be made rigid or strong, as required, and as the brace-rods bent under the strains produced by the check-down they were apt to break; also, the roll of the body occasioned in entering it when driving or when subject to the thrust of the wheel against the spring in cramping the wagon was not strongly controlled nor prevented, nor were the plates of the springs kept solidly together to prevent breaking them.

My invention has for its object to avoid or overcome these described objections, or, in other words, to produce a side-spring and sectional jointed-perch running-gear for vehicles in which the synchronous movement or extension of the side springs and perches is obtained, and they and the axles move together in unison under all conditions of service or travel. The load is divided or distributed upon both springs. The desired vertical adjustment for placing the perch-centers about on a horizontal line with their end connections for maintaining the axles in a vertical position under varying loads is fully effected and maintained. The torsional or twisting strains on the center connections for the perches and on the end connections for the side springs is compensated to avoid breaking or loosening of the parts of the same; the longitudinal strains on the end connections for the springs and the consequent squeaking and rattling at said connections are avoided; the center connections for perches are easily and economically made and correspondingly replaced when worn; the truss rods are inflexible or rigid, moving throughout absolutely in unison with parts of the running-gear to which they are attached for dividing or distributing the load equally upon both side springs, and the check-straps connecting the body and perches act to effectually check down both side springs alike to prevent rolling or pitching of the body when riding or when entering and getting out of the same, to also prevent the reaction or upthrust of the springs raising them and the body above their set position, and further to maintain the leaves of the spring in close contact, to avoid breaking the same by the thrust or cramping of the wheel against them when turning the vehicle, and thus secure easy and safe riding.

My invention accordingly consists of the construction, combination, and arrangement of parts comprising a side spring or bar vehicle having sectional perches jointed at their middle ends to the springs or bars, as hereinafter described and claimed, having reference, particularly, first, to side springs having free or loose end connections with the axles or bolsters thereon, which free ends permit the springs and perches to extend independently under a heavy load and avoid subjecting the end connections of the spring to reverse longitudinal strains and the consequent undue wear and noise, and, further, they permit the perch centers to be vertically adjusted as desired; second, to rubber or elastic supports for the ends of the side springs to admit of the ends of the springs canting laterally in unison with the canting of the axles, thus compensating for the torsional or twisting strains, and avoiding wear, rattle, and squeaking at said parts; third, to sectional or divided perches having at their center ends attached journals having free ends which fit into couplings or bearing-boxes secured to the side springs, said couplings having a yielding or tension bearing to admit of a vertical canting movement of the perch-journals in said couplings, whereby the torsional or twisting strains on said journals are compensated for and all breaking, bending, or deterioration of said journals is avoided, as is also all loosening of the component parts of the couplings and noise or squeaking at said parts; fourth, to couplings for the center journals of the perches composed of two parts, each of which is preferably made of different suitable metals for obtaining strength and lightness, and anti-friction bearings for the perch-centers, so as to avoid noise or squeaking and rattling of said parts; fifth, to crossing truss-rods, each connected at their rear ends to the rear axle and at their front ends to the forward ends of the rear sections of the perches, and are also further connected to the latter at points intermediate of the crossing of the truss-rods and their rear ends by means of strut and tie rods, whereby the rear sections of the perches are rigidly connected together to make them relatively inflexible and admit of them and the side springs, as well as the truss-rod, moving in unison throughout under all conditions of service; and, sixth, to check-straps, one on each side of the body, for uniting the rear sections of the perches to said body to check down both side springs alike for preventing rolling or pitching of the body and the upthrust of the springs carrying them above their set position, and also for keeping the leaves of the springs in close contact to avoid liability of breaking them when cramped by a wheel in turning the vehicle.

In the accompanying drawings, forming part hereof, I have shown a form of vehicle running-gear embodying my improvements, which form I have found to be practically and commercially efficient, and in which—

Figure 1 is a perspective view of the running-gear, showing the perches having attached journals in central couplings on the side springs and the crossing truss-rods connected to the rear axle and rear sections of the perches; Fig. 2, a plan of the same with spring-bars on the springs removed, showing the location of the check-straps connecting the rear sections of the perches to the body; Fig. 3, a longitudinal section of the body and running-gear. Fig. 4 is a perspective view of the component parts of the central coupling device attached to the side springs for pivoting the perches thereto, said component parts being detached from one another; Fig. 5, a perspective of said central coupling device, showing the parts thereof and the perch-journals in position; Fig. 6, a perspective showing part of an axle, a portion of one end of a side spring, and the seat or support on the axle for said spring, the clip for holding the spring end in position being removed; and Fig. 7, a perspective of said clip and of the anti-friction metallic stool therefor detached.

A and A' represent the front and rear axles, the front axle of which is shown provided with a bolster, B; but, if desired, in some forms of vehicles this bolster may be dispensed with. Said bolster is represented as centrally pivoted to the front axle, A, by a king-bolt, $b$, and to the bolster is rigidly attached the upper half of the fifth-wheel C, the lower half thereof being rigidly secured by clips or bolts $b'$ to the axle A in any well-understood way.

D D' indicate the half-elliptical or arched springs or bars. These springs have loose or free ends resting upon rubber or elastic blocks $e^4$, supported upon seats $e^2$, secured to the axles or bolsters thereon by clips E, which have the usual fastening-plates, $e$, and nuts $e'$. The blocks $e^4$ are maintained as regards their endwise position upon the seats $e^2$ by suitable transverse lips, $e^3$, on the upper sides of seats $e^2$ at their outer edges and by like lips, $d$, on the under sides of the ends of the side springs. The spring ends, as well as the rubber blocks $e^4$, are maintained in sidewise position upon seat $e^2$ by a clip, F, the shanks of which pass through openings $f^2 f^3$ in seat $e^2$, and are secured thereto by nuts in the usual way.

I prefer to insert an anti-friction stool or block, $f$, between the clip and top of spring to avoid wear and squeaking of the spring against the clip, and this stool may be secured in position in any suitable manner. In the drawings I have shown its upper side grooved or recessed, into which depend rivets or pins (indicated by dotted lines in Fig. 7) for keeping the stool in position between the spring and clip F.

The function of the rubber or elastic block $e^4$ is to permit the spring ends to twist or cant in their connections in unison with like movements of the gear to compensate for the same and avoid undue wear and squeaking noise, and the free ends for the springs admit of a slight longitudinal play of the spring ends in said connections, for purposes hereinafter to be described.

If desired, the ends of the springs may be formed with side edge lugs, as shown more plainly in Fig. 6, for abutting against the sides of clip F, and prevent the ends of springs leaving their connections when subjected to a sudden and powerful jerking action tending to spread the axles unduly apart.

Centrally to the side bars or springs, D D', are secured in any suitable manner coupling devices for the perch centers. These coupling devices I prefer to make as follows: Each coupling is composed of two plates or parts, I and I', of any suitable configuration, fitting together, and having side lugs, $i\,i$, with openings $i'\,i'$, for a purpose hereinafter set forth. The plates I and I' forming the coupling are preferably secured to the side springs by means of a clip, $i^{12}$, the shanks of which pass through openings $i^{11}$ in said plates. In the sides of the clip (see Fig. 4) are openings through which a bolt passes to firmly hold the clip and the coupling-plates I and I' to the side springs. A series of vertically-arranged openings, $i^{11}$, are placed in the plates I and I', to provide for raising and lowering the coupling-plates upon the springs, for a purpose hereinafter described. The plate I, I designate as the "main plate" and the plate I' as the "box-plate," because in it are formed part of journal-boxes $i^8$ and $i^9$, which parts are rigid and are recessed at their ends adjacent to the main plate to form chambers or spaces between said plates for the reception of end collars on the journals $j\,j'$, secured to or formed on the inner ends of the sectional perches J and J'. The corners of the coupling-plates below the boxes $i^8$ and $i^9$ are cut away to form open corners, as shown, and into these open spaces project the ends of a bottom plate, $i^4$, which is a part of main plate I'. The lower portion, $j^5$, for the journal-boxes $i^8\,i^9$ in box-plate I' have their upper faces conforming to the perch-journals and fit loosely into the box portion $i^8$ and $i^9$, being maintained therein against lengthwise movement by a pin, $j^4$, on each, which enter a respective slot, $i^{10}$, formed in the walls of the boxes $i^8$ and $i^9$. The bottom sides of the loose parts $j^5$ of the journal-boxes $i^8$ and $i^9$ are concaved transversely to the curve of their upper sides to fit and rest upon correspondingly-configured elastic blocks $j^6$, supported upon or inserted in suitably-shaped recesses on clips $i^2$. The latter, therefore, have on one side a lug provided with an opening, $i^7$, and upon the other side a shank which passes through the openings $i'$ in the side lugs, $i$, of plates I and I', and by means of nuts are secured to said lugs, and in doing this the box-plates I and I' are also secured together. The perch-journals therefore have close fitting and yielding bearings in the side-spring-coupling devices. The side lugs of the clips $i^2$ engage with set-screws $i^5$, provided with suitable washers, $i^6$, and passing through the bottom plate, $i^4$, of main plate I. The screws $i^5$ form adjusting devices for regulating the tension of the elastic blocks $j^6$ against the loose journal-box parts $j^5$, and the latter against the perch-journals. The journals are maintained against endwise movement in the bearings in the coupling-plates I and I' by their end collars fitting into the recesses between the main and box plates at the inner end of the journal-boxes. The outer ends of the perch-sections are secured to the axles or bolsters by clips in the usual or other suitable manner.

From the foregoing it will be noted that the perch-journals are attached to or form a part of the perches, that they have free ends and are firmly held in the coupling devices on the side springs to hold the center ends of the perches rigid, and that one or the lower half of the journal-boxes in the couplings is elastically supported under tension for permitting the perch-journals canting vertically in their journal-boxes when subject to torsional twisting or canting strains of the running-gear. This play or movement of the perch-journals in their boxes therefore avoids breaking of any parts of the coupling devices, and also bending or straining of said parts, and they do not therefore become loose, and all rattling or noise of said parts is avoided. By inserting the shanks of the clip $i^{12}$ in different openings $i^{11}$ of the series of the same the couplings are raised or lowered upon the side springs to vertically adjust the line of the perch centers or journals relatively to that of their end connections, as the elastic strength of the respective springs may require a light or heavy load. This vertical adjustment of the perch centers is positive because the free ends of the side springs permit axles to be drawn together or spread apart in making said vertical adjustment without varying the height of the springs.

The plates I and I' may be made of any suitable material; but I prefer to make the plate I of phosphor-bronze, as it is light, but strong, and is more or less flexible, so that if bent at any time when in use it can be straightened out; and, further, I prefer to make the box-plate I' and the journal-box parts $j^5$ of a suitable composition, either metallic or other material, which is anti-friction in its nature to avoid wear and squeaking, and thus dispense with the use of lubricants for said journals and boxes.

As before stated, the main and box plates I and I' may be configured as desired; but I prefer to incline their sides, as shown, and fit them together by a dovetail tongue and groove at the bottom, as shown. The inclined sides admit of easily fitting the plates, and when the nuts on the shanks of the clips $i^2$ are tightened the plates I and I' come snugly together to firmly secure them together, and this securement is increased by the fastening-nuts on the shanks of clips $i^{12}$, which hold the same to the side springs, so that said couplings are strong in themselves and are correspondingly secured to the side springs. The adjusting-screws $i^5$ firmly support the free or cut-away side of the clips $i^2$, so that they are effectively as strong as if they had double shanks, and these screws are so located that access is readily obtained thereto for adjusting them.

Beyond where the side springs are suitably supported upon or connected to the rear axle, A' are attached, by means of clips, truss-rods N and N'. These truss-rods cross each other between the rear sections of the perches and are secured in any suitable manner at their intersection, as indicated at $n^2$, Fig. 1, and their inner ends are connected to the center ends of the respective rear sections of the perches, as shown. From the rear axle the truss-rods incline downwardly under the perch-sections whereat the rods are secured to the perches by a T or other shaped strut, having bolt-fastening $n'$. From the struts the truss-rods slope upwardly to and are clipped or otherwise fastened to the center ends of the rear perch-sections. Suitable tie-rods, $n^6$, connect or brace the strut and truss rods to give additional strength to the same at the points where the strut-rods connect with the perches. These described truss-rods and their connections to the rear-axle perches and to each other make the same very strong and inflexible, so that no one part of the gear moves without its motion being communicated to the remaining part of the gear, and hence the axles, perches, and side springs move in unison with each other. At a point central to the side springs on each side and near them a check-strap, P, made of any suitable material, is attached to the body of the vehicle or to iron supports $p$ thereon, (see Fig. 3,) and each strap passes around a rear perch-section. As the angle between the body and the rear sections of the perches is an acute one, and as the check-straps are drawn up tight enough to reduce the camber of the spring to that required for an ordinary load, and as the closing of said angle when the body is depressed is but slight, and that gradually, the check-straps merely lose part of their tension without becoming slack; hence on the reverse movement of the body the check-straps correspondingly become taut and the thrust of the springs is gradually and gently checked, and their return thrust is likewise and fully stopped at the set first fixed; also, the plates of the latter are held in close contact, so that they cannot be broken or damaged by a heavy thrust of the wheel against them in cramping the vehicle, and any rolling of the body when in action is prevented.

It will be obvious to those skilled in carriage-building that the central coupling device for the perch-journals is, with but slight modifications, equally applicable to and susceptible of use on the body as well as on the side springs, and also in vehicles having long divided gears.

For example, by providing additional stock to double the width of the center part of the box-plate I', for the purpose of furnishing material for the reception of holes for the insertion of the shanks of the clip $i^{12}$ on the springs, and by then dividing the coupling device centrally, and setting at any desired distance apart the perch-journals therein, said parts have the same functions as hereinbefore fully explained.

As it is therefore obvious that the detail parts may be variously changed and constructed without departing from the spirit of my invention, I do not confine myself to the same as herein shown; but

What I claim is—

1. In a running-gear for vehicles having side springs, sectional perches having their center ends provided with journals, and coupling devices for the journals of the perches, having yielding bearings for said journals to admit of a canting movement of the journals in said bearings, substantially as set forth.

2. In a running-gear having side springs, sectional perches having at their center ends attached journals provided with end collars, in combination with coupling devices having yielding bearings for said journals, substantially as and for the purpose set forth.

3. A running-gear having side springs provided with coupling-boxes, in combination with sectional perches having at their center ends attached journals provided with end collars which fit into bearings in said coupling-boxes, substantially as and for the purpose set forth.

4. The combination, with a vehicle-body and its running-gear, of sectional perches having attached journals at their center ends and coupling devices for said journals, having yielding bearings for the journals to admit of a canting movement of the journals in their bearing, substantially as and for the purpose set forth.

5. A running-gear for vehicles having side springs provided with free end connections with the axles and bolsters of the gear, in combination with sectional perches having journals at their center ends and coupling devices having elastic or yielding bearings for said journals, substantially as and for the purpose set forth.

6. A running-gear for vehicles having side springs provided with free end connections with the axles and bolsters of the gear and elastic supports in said connections for the free ends of the springs, substantially as and for the purpose set forth.

7. A running-gear for vehicles having side springs provided with free ends, step and coupling devices for connecting said ends to the axles or bolsters of the gear, and an elastic block or bearing between the ends of the spring and said step, substantially as set forth.

8. A running-gear for vehicles having side springs provided with free end connections with the axles and bolsters of the gear, elastic supports in said connections for the free ends of the springs, sectional perches having journals at their center ends, and coupling devices having yielding bearings for said journals, substantially as set forth.

9. A running-gear for vehicles having side springs provided with free end connections with the axles and bolsters of the gear and elastic supports in said connections for the free ends of the springs, in combination with sectional perches having journals at their center ends, coupling devices having yielding bearings for said journals, truss and tie rods connecting the rear axle or bolster and rear sections of the perches, and check-straps connecting the vehicle-body and the rear sections of the perches, substantially as set forth.

10. In a running-gear for vehicles, the combination of longitudinal side springs, seats $e^2$, elastic blocks $e^4$ on said seats, and clips F, substantially as and for the purpose set forth.

11. In a running-gear for vehicles, the combination of longitudinal side springs, seats $e^2$, elastic blocks $e^4$ on said seats, blocks $f$, and clips F, substantially as and for the purpose set forth.

12. In a running-gear for vehicles, the combination of longitudinal side springs having turned-down or lipped ends, seats $e^2$, having at their forward ends transverse ribs or lugs, elastic blocks on said seats between said lips, and clips F, and anti-friction blocks $f$, substantially as set forth.

13. In a running-gear for vehicles, the combination of longitudinal side springs having turned-down ends and side lugs at said ends, seats $e^2$, having at their forward ends transverse ribs or lugs, elastic blocks on said seats, clips F, and anti-friction blocks $f$, substantially as set forth.

14. The combination, with an axle or bolster, of a seat, $e^2$, clipped to the axle or bolster and having lug $e^3$ and openings $f^2 f^3$, an elastic block, $e^4$, clip F, and block $f$, substantially as and for the purpose set forth.

15. In a running-gear having longitudinal side springs and sectional perches having journals at their center ends, coupling devices clipped or secured to the side-springs, and yielding bearings in said couplings for the perch-journals, substantially as set forth.

16. In combination with the side springs of a running-gear for vehicles, the coupling plates or boxes I I', having yielding boxes provided with tension devices, and sectional perches having attached journals at their center ends and yielding bearings on said boxes, substantially as set forth.

17. The combination of plates I and I', clips $i^2$, bearings $j^5$, elastic blocks $j^6$ between said clips and bearings. and tension-screws $i^5$, substantially as and for the purpose set forth.

18. The combination of flexible metallic plate I, anti-friction metal plate I', coupled together by clips $i^2$, yielding journal-boxes on said clips, and tension-screws for the latter, substantially as set forth.

19. In a running-gear for vehicles having side springs, the combination of plates I and I', having side lugs, bearings, and spaces between the adjacent walls of said plates, clips $i^2$, supporting yielding bearings $j^5$, and tension-screws $i^5$, in combination with perches having journals $j'$, provided with end collars fitting said bearings and spaces in plates I and I', substantially as set forth.

20. In running-gears for vehicles, the combination of two longitudinal side springs having at their ends turned-down lips, an axle, a bolster, and clips, secured, respectively, to said axle and bolster, supporting-seats, elastic blocks, and means for holding said springs upon said seats, central coupling devices on said springs, rear perches journaled in said coupling devices and attached to said axle, and truss-rods attached to said axle and perches, substantially as and for the purposes set forth.

21. In running-gears for vehicles, the combination, with coupling devices such as described, of the longitudinal side springs with T-shaped extremities and turned-down lips, an axle and a bolster, and clips secured, respectively, to said axle and bolster and provided with supporting-seats having turned-up lips, and means, substantially as described, for holding said spring to said seats, and double front and rear perches journaled in said coupling devices and their opposite extremities attached to said axle and bolster, substantially as described, and for the purposes set forth.

22. In running-gears for vehicles, the combination of a longitudinal side spring, a double-shank clip having holes in the sides thereof for receiving a bolt, and a coupling device, substantially as described, supported upon or by said spring by said clip, substantially in the manner and for the purposes set forth.

23. In running-gears for vehicles, the combination of a bolster, an axle, and two longitudinal side springs having end seats and elastic supports, two central coupling devices held rigidly to said springs, double perches in journal-boxes therein and their opposite extremities attached to said bolster and axle, and two check-straps, all arranged in the manner shown and described, for the purposes set forth.

24. In running-gears for vehicles, the combination, with two central coupling devices, of rear perches journaled therein and with their opposite extremities secured by means of clips to an axle, of an axle, and truss-rods provided with vertical struts secured to said axle and perches, a body, and check-straps secured to said rear perches and body, substantially as and for the purposes set forth.

25. The combination, with the central coupling device and perches held in journal-boxes therein, and with their opposite extremities fastened to an axle, of an axle, and truss-rods provided with struts and tie-rods secured, respectively, to said axle and perches, and two check-straps arranged as shown and operating in the manner and for the purposes set forth.

26. In running-gears for vehicles, a coupling device composed of two metallic plates held solidly together, two anti-frictional boxes, and elastic pressers, all combined and arranged substantially as and for the purposes set forth.

27. In running-gears for vehicles, the combination of a coupling device consisting of main and box plates having ears on the sloping sides thereof, the clip $i^2$, anti-frictional metallic journal-boxes, elastic pressers $j^6$, and set-screws $i^5$, all arranged as and for the purposes set forth.

28. The combination, with the central coupling device consisting of the main plate and anti-friction box-plate, the end clips, anti-friction metallic boxes, and elastic pressers $j^6$, of the clip $i^{12}$, having openings in its sides to receive a bolt, the double shanks of which fit into the legs of said coupling device for adjusting it vertically, substantially as described.

29. The combination, with the central coupling device consisting of two sections held solidly together, of front and rear perches held in journal-boxes provided in said device to receive them, and a clip, such as described, for adjusting vertically said device, substantially as described.

30. A running-gear for vehicles having side springs, elastic supports for the ends of said springs to admit of a canting motion, central coupling devices secured to said springs and having yielding journal-boxes, sectional perches having journals at their center ends adapted to said yielding boxes, and crossing truss-rods, as described, connecting the rear perch-sections and rear axle, in combination with the wagon-body and two check-straps, one on each side, connecting the body and both rear perch-sections, substantially as set forth.

In witness whereof I have hereunto set my hand in the presence of two subscribing witnesses.

E. D. WELLER.

Witnesses:
ANDREW ZANE, Jr.,
HERMANN BORMANN.